Sept. 16, 1947.　　　　R. B. TEMPLE　　　　2,427,634

HEAVY DUTY WHEEL RIM

Filed Jan. 9, 1945

(Prior Use)

Robert B. Temple
INVENTOR

BY John P. Dashry
ATTORNEY

Patented Sept. 16, 1947

2,427,634

UNITED STATES PATENT OFFICE 2,427,634

HEAVY-DUTY WHEEL RIM

Robert B. Temple, Grosse Pointe, Mich., assignor to The Budd Company, Philadelphia, Pa., a corporation of Pennsylvania Application January 9, 1945, Serial No. 572,021

3 Claims. (Cl. 152—409)

The invention relates to wheel rims and particularly to the class of rims for use with heavy duty wheels and tires.

The invention is principally concerned with rims of this class which have relatively fixed and removable annularly continuous rim parts each having a tire bead seat portion and an adjacent tire retaining flange. According to a usual arrangement, these rim parts are secured together by an annular series of screw-threaded securing means, such as headed screws or studs and nuts, which extend through axially aligned holes provided in interseating radially inwardly extending flanges on the respective parts.

Figure 4:
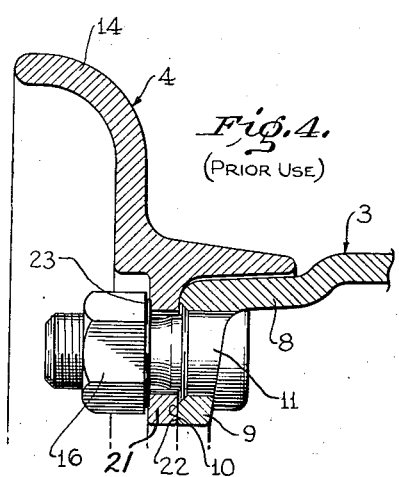

With this usual arrangement, as shown in Fig. 4, trouble is sometimes experienced, particularly under extreme conditions of loading and where pneumatic tires having relatively stiff side walls are used, with early failure of the screw-threaded securing means. Among the reasons for this failure are believed to be the following.

In the zone of loading, that is, in the ground engaging region of the wheel, the removable rim part, because of the high lateral loading of the tire-retaining flange thereof, twists outward. In so doing, it pries the nut, in the case of a stud and nut securement, or the head of a headed securing screw, outwardly under considerable leverage, with the result that the load on the stud or screw becomes many times greater than the lateral load on the tire retaining flange.

The stud or screw is not only so overloaded, but in addition, the prying action on the nut or head is such that the major load thereon is located at the radially outer engaging surfaces. This results in cocking the stud or screw and causes it to be unevenly strained—with the peak strain lying on that portion of the circumference farthest removed from the center of the wheel. Since every stud or screw is so peak stressed at every revolution of the wheel, the stud or screw is conditioned for early fatigue failure.

It is a principal object of the invention to overcome this difficulty in this class of rim and to provide a rim construction which is simple and readily manufactured and in the use of which such deleterious strains on the securing bolts or screws are substantially eliminated.

This object is attained in large part by employing a separate clamping ring for holding the removable rim part in place, and by forming the radially outer portion of said ring and the adjacent portion of the fixed rim part with a shallow annular groove which is disposed as close as possible to the securing screws or studs, and in mounting loosely in this groove a radially inner portion of the removable rim part. This construction avoids the objectionable magnification of the lateral load on the studs or screws, because it eliminates the prying action above referred to. There exists a slight tendency for the clamping ring to twist outwardly, but by reason of the close adjacency of its load-carrying face provided by the outer wall of the above-mentioned groove to the series of securing studs or screws, this tendency is very much reduced as compared with the prior construction. Furthermore, the resistance to twist is taken care of substantially wholly by the polar moment of inertia of the ring cross-section.

The foregoing and other objects and advantages and the manner in which they are attained will become apparent from the following detailed description when read in connection with the drawings forming a part of this specification.

Figure 1:
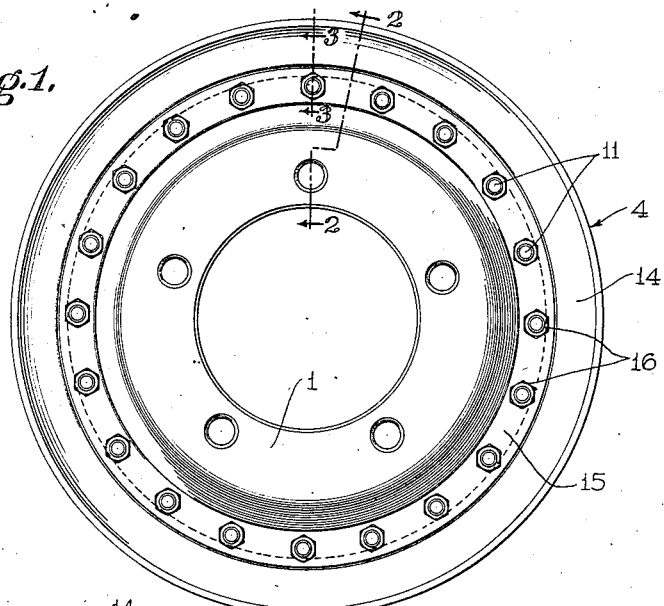
Figure 2:
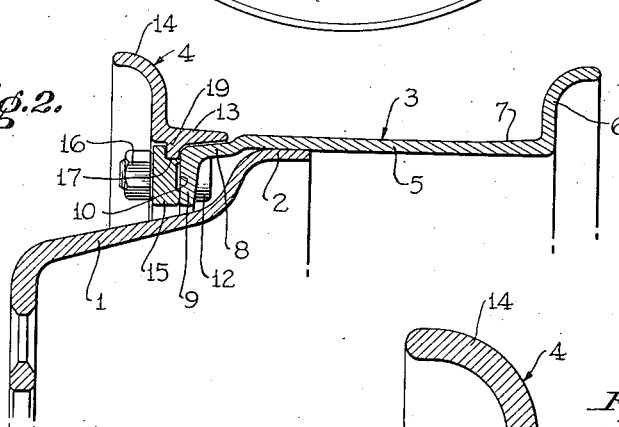
Figure 3:
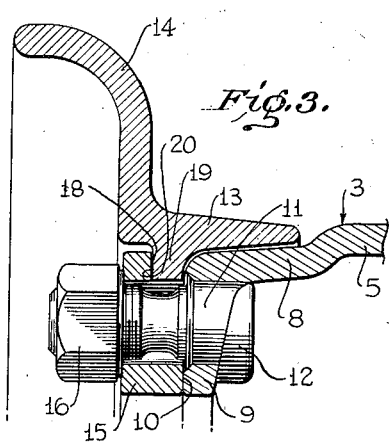

In the drawings,

Fig. 1 is an outboard face view of a wheel to which the invention is shown applied, Fig. 2 is an axial sectional view on an enlarged scale taken substantially along the line 2—2 of Fig. 1, Fig. 3 is a similar sectional view, on a further enlarged scale, taken substantially along the lines 3—3 of Fig. 1, and Fig. 4 is a section similar to Fig. 3 of a prior use construction shown here for comparative purposes.

In the embodiment of the invention selected for illustration, the rim is shown associated with a disc wheel body indicated by the numeral 1, said body having a peripheral flange 2 upon which the rim is seated and secured in a usual manner.

The rim is comprised of two parts, namely, a part 3, in this case shown secured to the wheel body 1, and termed herein, the relatively fixed rim part, and the part 4 removably secured to part 3, and herein termed, the removable rim part; this removability being for the purpose of readily mounting and dismounting a heavy duty pneumatic tire (not shown).

The part 3 is formed as usual with a rim base portion 5 terminating inboard in a tire retaining flange 6 adjacent to which the rim base portion provides a slightly inclined tire bead seat portion 7. At its outboard margin, the part 3 is formed with a radially inwardly offset portion 8 terminating in a radially inwardly extending flange 9 provided on its outboard side with a flat clamping face 10.

In the present embodiment, this flange 9 is provided with an annular series of securing studs or bolts 11 suitably non-rotatably secured in axial openings in the flange with their heads 12 seated against the inboard face thereof and their threaded ends projecting outwardly therebeyond.

The removable rim part 4 comprises the outboard slightly inclined tire bead seat portion 13, normally seated in the depression formed by the offset portion 8 of rim part 3, and the adjacent tire retaining flange 14. According to the invention, rim part 4 is secured in place by a clamping ring 15, which, particularly in the regions between bolts or studs 11 as shown in Fig. 2, has a wide radial seating engagement with the outboard face 10 of the flange 9. This ring is provided with holes aligned with the studs 11 and of a diameter freely receiving the studs and is firmly clamped in place on its seat by the nuts 16 screwed onto the outer screw-threaded ends of the studs.

Radially outwardly of the studs 11, but closely adjacent thereto, the ring 15 and the adjacent portion of the fixed rim part 3 together provide a shallow groove 17 having an outboard flat substantially radially extending side wall 18. The said groove is formed, in the embodiment shown, by a recess in the ring provided by its generally L-shaped cross section; and the adjacent part of the flange 9. It is adapted to loosely receive therein a radially inner portion, in this case, the short radial flange 19 of the removable rim part 4, which flange has an outboard face 20 adapted to seat against the flat-faced outboard side wall 18 of the groove 17.

The ring 15 is of a cross-section making it relatively stiff against twisting, particularly when clamped in place by the plurality of studs and nuts 11, 16, in this instance and as shown in Fig. 1, twenty in number. By reason of the stiffness of the ring and the close adjacency of the interengaging faces 18 and 20 to the studs, the latter take the outward loading on the flange 14 with substantially no bending strain thereon and the loose arrangement of the removable rim part 4 in the groove 17 permits it to twist under load without prying action tending to additionally load the studs.

By reference to the prior construction shown in Fig. 4, it will be seen that the invention eliminates the objectionably high and eccentric loading of the studs possible with that construction. In said prior construction, the flange 21 on the removable rim part 4 is perforated and secured directly to the clamping face 10 of the fixed rim part 3, by the annular series of studs 11 and nuts 16. It will be seen that the extremely high lateral loading on the flange 14, encountered under certain extreme conditions of service, first tends to twist the rim part 4 and exerts a powerful lever action, with the fulcrum of the lever at 22 and the maximum loading applied to the nut at 23, thus exerting an enormous strain upon the radially outer portions of the stud 11. This strain is repeated for each revolution of the wheel, so that, with this arrangement and under such extreme loading conditions, the conditions are ripe for rapid fatigue of the metal of the stud and consequent early fatigue failure thereof.

On the other hand, with the improved arrangement as shown in Figs. 1 to 3, there is no such prying action, and therefore no overloading and unevenly straining of the studs, even under extreme loading conditions, since the slight eccentricity of loading on the clamping ring 15 with respect to the studs is resisted by the stiffness of the ring against twisting and any twisting of the removable rim part 4 is not transformed into a prying action on the studs by reason of the loose fit of said part in the groove 17. The harmful prying action on the studs present in the prior construction is thus entirely avoided by the improved construction.

While the invention has been herein described in a specific embodiment, it will be understood that changes and modifications may be made by those skilled in the art without departing from the main features of the invention, and such changes and modifications are intended to be covered in the appended claims.

I claim:

1. In a heavy duty rim of the class having relatively fixed and relatively removable annularly continuous rim parts each having a tire bead seat portion adjacent a tire retaining flange and in which said parts are secured together by an annular series of screw means, the securing means comprising a relatively deep radial flange on said fixed rim part provided with a clamping face on its outboard side, a relatively shallow radially inwardly extending flange on said removable rim part, and a separate securing ring adapted to seat on said clamping face and clamped thereto by an annular series of screw means, the radially outer portion of said securing ring forming with said fixed rim part a shallow annular groove opening radially outwardly, the bottom of said groove lying on a circle just outside the circle of said annular series of screw means and said groove being of a width adapted to receive said relatively shallow flange of said removable rim part with freedom for slight lateral play between said shallow flange and the sides of said groove, whereby strain on the screw means is materially reduced.

2. In a heavy duty rim of the class having relatively fixed and relatively removable annularly continuous rim parts each having a tire bead seat portion adjacent a tire retaining flange and in which said rim parts are secured together by an annular series of screw means, the securing means comprising a radially extending clamping face on the outboard side of said fixed rim part and a separate securing ring for said removable rim part adapted to seat on said clamping face and clamped thereto by an annular series of screw means, the radially outer portion of said securing ring and said fixed rim part together forming a shallow annular groove opening radially outwardly, the bottom of said groove lying on a circle just outside the circle of said annular series of screw means and said groove being of a width adapted to receive a radially inner portion of said removable rim part with freedom for slight lateral play thereof with respect to the sides of said groove, whereby axially outward pressure of a tire on said removable rim part is transmitted to the screw means without unduly straining them.

3. In a heavy duty rim of the class having relatively fixed and relatively removable annularly continuous fixed and removable rim parts each having a tire bead seat portion adjacent a tire retaining flange and in which said rim parts are secured together by an annular series of screw means, the securing means comprising a generally radially extending clamping face on the outboard side of said fixed rim part and a separate securing ring of substantially L-shape in cross section adapted to seat on said face and be clamped thereto by an annular series of screw means, the L-shape of the securing ring and the adjacent portion of the clamping face on said fixed rim part together forming a shallow annular groove opening radially outwardly, the bottom of said groove lying on a circle just outside the circle of said annular series of screw means and said groove being of a width adapted to receive a radially inner portion of said removable rim part with freedom for slight lateral play thereof with respect to the sides of said groove, whereby strain on the securing means is minimized.

ROBERT B. TEMPLE.

REFERENCES CITED

The following references are of record in the file of this patent:

UNITED STATES PATENTS

| Number | Name | Date |
| --- | --- | --- |
| 1,402,032 | Williams | July 3, 1922 |
| 1,675,630 | Ash | July 3, 1928 |